(12) United States Patent
Rambosek et al.

(10) Patent No.: US 7,170,708 B2
(45) Date of Patent: Jan. 30, 2007

(54) PREVENTION OF DATA STORAGE TAPE DETACHMENT FROM DATA STORAGE CARTRIDGES

(75) Inventors: G. Phillip Rambosek, Shafer, MN (US); Raul Andruet, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/091,613

(22) Filed: Mar. 28, 2005

(65) Prior Publication Data

US 2006/0232872 A1 Oct. 19, 2006

(51) Int. Cl.
*G11B 15/18* (2006.01)
*G11B 19/02* (2006.01)

(52) U.S. Cl. ...................................... 360/69
(58) Field of Classification Search ............. 242/334.4, 242/348.1, 348.4
See application file for complete search history.

(56) References Cited

U.S. PATENT DOCUMENTS 5,155,639 A * 10/1992 Platter et al. ................. 360/95
6,188,536 B1 * 2/2001 Chliwnyi .................... 360/74.3
6,493,167 B2 * 12/2002 Kobayashi et al. ......... 360/72.3

* cited by examiner

Primary Examiner—K. Wong
(74) Attorney, Agent, or Firm—Eric D. Levinson

(57) ABSTRACT

The invention is directed to techniques to substantially reduce or eliminate detachment of data storage tape from data storage cartridges. A data storage cartridge may include a housing enclosing a spool with data storage tape spooled on the spool. A region of the data storage tape extends from the spool to an opening in the housing. An end of the data storage tape is held at the opening to allow tape drives to grasp the data storage tape and retrieve data stored on the data storage tape. When dropped, the data storage cartridge experiences impact loads. The techniques described herein rotate the spool to generate slack such that the region of data storage tape comprises substantially no tension. In this way, the techniques prevent detachment of the data storage tape from the opening due to the impact loads.

20 Claims, 8 Drawing Sheets

PREVENTION OF DATA STORAGE TAPE DETACHMENT FROM DATA STORAGE CARTRIDGES

TECHNICAL FIELD

The invention relates to data storage media and, more particularly, data storage cartridges.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium for storing large amounts of data. For example, magnetic tape cartridges, or large spools of magnetic tape are often used to back up large amounts of data for large computing centers. Magnetic tape cartridges also find application in the backup of data stored on smaller computers such as workstations, desktop or laptop computers.

Automated cartridge libraries provide access to vast amounts of electronic data by managing data storage cartridges, such as magnetic tape cartridges. Automated cartridge libraries exist in all sizes, ranging from small library systems that may provide access to twenty or fewer data storage cartridges, to larger library systems that may provide access to thousands of data storage cartridges. In a conventional automated cartridge library system, an automation unit, such as a robotic arm or other mechanism, selectively retrieves a data storage cartridge from a storage location and loads the retrieved data storage cartridge into a designated drive to access data stored by the data cartridge.

A conventional data storage cartridge may include tape with a magnetic recording layer wound on one or more reels or hubs. Examples of various magnetic tape cartridges include digital linear tape (DLT) cartridges, linear tape-open (LTO) cartridges, 9840 cartridges, 9940 cartridges and a wide variety of other cartridge types. Each of the various types of magnetic tape cartridges may conform to a different form factor. Moreover, many data storage tape cartridges, such as DLT cartridges, are designed for magnetic tape that includes a leader to allow the tape to be withdrawn from the cartridge to be read. The leader is attached to an end of the magnetic tape, and may be supported in notches adjacent the opening in the data storage cartridge when the cartridge is not in use. A drive can grasp the leader and pull the magnetic tape through the drive to read data from or write data to the tape. Magnetic tape cartridges are available from several manufacturers including Imation Corp. of Oakdale, Minn. and StorageTek of Louisville, Colo.

When a tape cartridge is not being read within a tape drive, mishandling of the cartridge is a major concern. For example, a user may drop the data storage cartridge during loading or unloading of the cartridge into a drive, possibly causing damage to the cartridge. In the case of an automated cartridge library, the robotic arm or other mechanism can drop the data storage cartridge between the storage location and the designated drive. In either case, the impact loads caused by dropping the data storage cartridge can cause the leader to detach from the notches or otherwise "pop-out" of the cartridge. When the leader "pops-out," drives may have difficulty accessing the tape, possibly rendering the data storage cartridge unusable.

SUMMARY

In general, the invention is directed to techniques to reduce or substantially eliminate detachment of data storage tape from data storage cartridges. In particular, the techniques described herein can reduce or substantially eliminate the phenomenon referred to as "pop-out," in which a leader undesirably extends from the data storage tape cartridge when the cartridge is dropped.

A data storage tape cartridge may include a housing enclosing a spool, with data storage tape spooled about the spool within the cartridge. A region of the data storage tape extends from the spool to an opening in the housing. An end of the data storage tape may include a leader, and is held at the opening to allow tape drives to grasp the data storage tape and retrieve data stored on the data storage tape. As described herein, the spool can be rotated to introduce slack in the region of the data storage tape extending from the spool to the opening. This causes the region of the data storage tape extending from the spool to the opening to comprise substantially no tension, which can reduce or eliminate the occurrence of "pop-out."

As described herein, a controller spools data storage tape onto the spool enclosed in the housing by rotating the spool in a first direction. The controller detects a locking position of the spool at which the region of the data storage tape between the spool and the opening in the housing is taut. Upon detecting the locking position, the controller rotates the spool in a second direction, opposite the first direction, such that the region of the data storage tape that extends from the spool to the opening in the housing comprises a length greater than a distance between the spool and the opening. In other words, the controller purposely introduces slack in the region of tape that extends between the spool and the opening in the housing of the cartridge.

Conventional data storage cartridges hold the region of data storage tape between the spool and the opening in the housing taut. The tension in the region of data storage tape created by the impact loads typically causes the leader to pop-out or detach from the notches. When the end of the data storage tape is no longer held at the opening in the housing, a tape drive may have difficulty grasping the data storage tape to retrieve data from the data storage tape. In that case, the data storage cartridge may become unusable, or require maintenance to address the pop-out.

In one embodiment, the invention is directed to a data storage cartridge comprising a housing including an opening, a spool enclosed in the housing, and data storage tape spooled on the spool. A region of the data storage tape extends from the spool to the opening in the housing with an end of the data storage tape held at the opening. The spool is rotated such that the region of the data storage tape extending from the spool to the opening comprises substantially no tension.

In another embodiment, the invention is directed to method comprising spooling data storage tape onto a spool enclosed in a housing of a data storage cartridge through an opening in the housing. The method further comprises detecting a locking position of the spool at which a region of the data storage tape extending from the spool to the opening in the housing with an end of the data storage tape held at the opening is taut. The method also includes rotating the spool from the locking position such that the region of the data storage tape extending from the spool to the opening comprises substantially no tension.

In another embodiment, the invention is directed to a system comprising a data storage cartridge including a spool enclosed in a housing, the housing including an opening, and a controller that spools data storage tape onto the spool through the opening in the housing. The controller detects a locking position of the spool at which a region of the data storage tape extending from the spool to the opening in the housing with an end of the data storage tape held at the opening is taut, and rotates the spool from the locking position such that the region of the data storage tape extending from the spool to the opening comprises substantially no tension.

The invention may be capable of providing one or more advantages. For example, in the event that a data storage cartridge is dropped, the techniques described herein substantially reduce or eliminate the possibility of the end of the data storage tape detaching from the opening in the housing of the data storage cartridge. In this way, the amount of data storage cartridges rendered unusable or requiring maintenance due to leader pop-out may substantially decrease.

A leader included at the end of the data storage tape may comprise a leader tape, a leader pin, or a leader block. The leader may comprise a substantially stiff leader tape that extends from the spool to the opening in the housing. In that case, when the spool is rotated, slack is introduced in the stiff leader tape. The leader may also comprise a leader pin or a leader block that extends over the very end of the data storage tape such that a flexible region of the data storage tape extends from the spool to the opening in the housing. In that case, the invention may also help reduce the occurrence of data storage tape breakage within the cartridge. This may be particularly useful as next generation data storage tapes, which may be thinner and more fragile than current tape.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
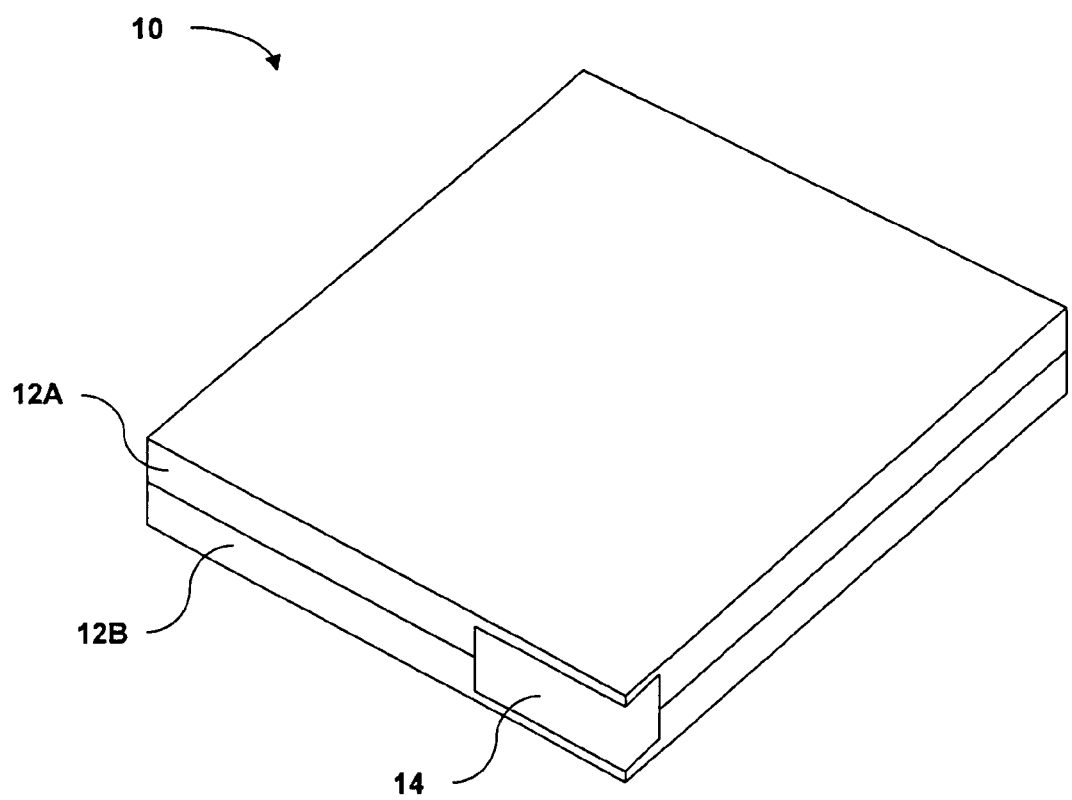
FIG. 1 is a schematic diagram illustrating a data storage cartridge.

FIG. 1 is a schematic diagram illustrating a data storage cartridge 10. Data storage cartridge 10 comprises a housing with a top portion 12A and a bottom portion 12B ("housing 12"). Housing 12 includes a door 14. Housing 12 may enclose data storage tape spooled on a spool. Door 14 covers an opening in housing 12 that allows access to the data storage tape within housing 12.

In accordance with the invention, the data storage tape may be held within housing 12 in such a way as to prevent the data storage tape from detaching from the data storage cartridge when experiencing impact loads from being dropped, for example. In particular, the data storage tape within housing 12 comprises substantially no tension when the spool moves within housing 12 with respect to door 14.

Housing 12 of data storage cartridge 10 may conform to a form factor of a conventional data storage cartridge or a next generation data storage cartridge. Examples of conventional magnetic tape cartridges include digital linear tape (DLT) cartridges, linear tape-open (LTO) cartridges, 9840 cartridges and 9940 cartridges. Each of the various types of magnetic tape cartridges may conform to a different form factor.

In some cases, data storage cartridge 10 may be used to backup data stored on smaller computers such as workstations, desktop or laptop computers. In other cases, data storage cartridge 10 may be used to back up large amounts of data for large computing centers. For example, data storage cartridge 10 may be included in an automated cartridge library. Automated cartridge libraries range from small library systems that may provide access to twenty or fewer data storage cartridges, to larger library systems that may provide access to thousands of data storage cartridges. An automation unit, such as a robotic arm or other mechanism, may selectively retrieve data storage cartridge 10 from a storage location and load data storage cartridge 10 into a designated drive to access data stored by data storage cartridge 10.

Figure 2:
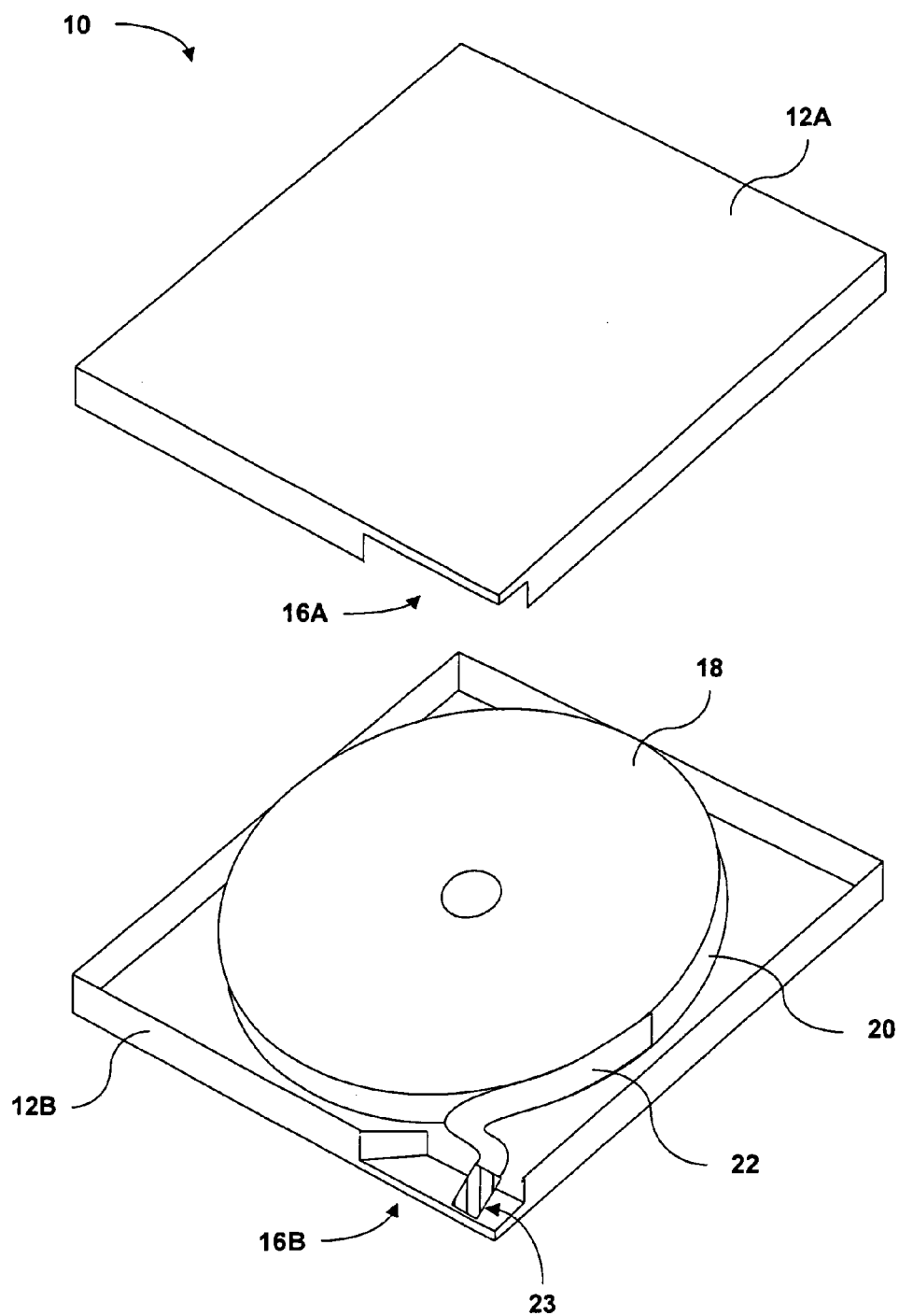
FIG. 2 is a schematic diagram illustrating an exploded view of the data storage cartridge.

FIG. 2 is a schematic diagram illustrating an exploded view of data storage cartridge 10. Top portion 12A of housing 12 has been removed from bottom portion 12B to expose an interior of data storage cartridge 10. Housing 12 encloses a spool 18 with data storage tape 20 spooled on spool 18. In some embodiments, data storage cartridge 10 may comprise a magnetic tape cartridge and data storage tape 20 may comprise tape with a magnetic recording layer on one or both sides of the tape. In other embodiments, data storage cartridge 10 may include another type of data storage tape, such as optical tape or holographic tape.

As shown in FIG. 2, door 14 has been removed from housing 12 for purposes of illustration. Top portion 12A includes a portion 16A of an opening in housing 12 and bottom portion 12B includes another portion 16B of an opening in housing 12 ("opening 16"). When data storage disk 10 is not in use, door 14 (FIG. 1) covers opening 16 in housing 12 to protect data storage tape 20 from dust and debris. When data storage cartridge 10 is inserted into a tape drive, door 14 opens to allow the tape drive access to data storage tape 20 to read data recorded on data storage tape 20. In some cartridges, however, door 14 may be eliminated as it is an optional feature to help reduce the infusion of dust or debris into the cartridge.

A region 22 of data storage tape 20 extends from spool 18 to opening 16 in housing 12. An end of data storage tape 20 is held at opening 16. In the illustrated embodiment, the end of data storage tape 20 includes a leader 23. Leader 23 may comprise a leader tape, a leader pin, a leader block, or another type of leader capable of interfacing with a tape drive. Housing 12 may include notches or other elements adjacent opening 16 that hold leader 23 at opening 16 in housing 12. Leader 23 is held at opening 16 in such a way as to not interfere when door 14 closes over opening 16. In the illustrated embodiment, leader 23 comprises a leader pin or a leader block that extends over the very end of data storage tape 20. In other embodiments, leader 23 may comprise a substantially stiff leader tape that extends from spool 18 to opening 16 in housing 12. In some cases, a stiff leader tape may be up to approximately 18 inches (45.7 cm) in length.

As illustrated in FIG. 2, region 22 of data storage tape 20 between spool 18 and opening 16 includes slack. In general, region 22 of data storage tape 20 comprises a length greater than a distance between a tangent point of spool 18 and a face of housing 12. According to the techniques described herein, spool 18 may be rotated to generate slack in region 22 of data storage tape 20. Generating slack allows region 22 of data storage tape 20 to comprise substantially no tension. Spool 18 may be rotated by a predetermined amount based on a diameter of spool 18 and a length of slack desired in region 22 of data storage tape 20. The length of slack desired may depend on a distance spool 18 is capable of moving in any direction within housing 12. In any case, region 22 of data storage tape 20 comprises substantially no tension when spool 18 moves relative to opening 16 in housing 12.

As mentioned, a user or a robotic arm, in the case of an automated cartridge library, may drop data storage cartridge 10 en route between a storage location and a tape drive. When dropped, data storage cartridge 10 experiences impact loads that may cause spool 18 to move relative to opening 16 of housing 12 and/or cause deformation of housing 12. Slack in region 22 of data storage tape 20 enables region 22 to be substantially unaffected by the impact loads. In this way, the techniques prevent leader 23 from popping-out of the notches in housing 12 due to tension in region 22 of data storage tape 20.

A tape drive reads data stored on data storage tape 20 by grasping leader 23 and feeding data storage tape 20 into the tape drive. Data storage tape 20 may be fed past a read head capable of detecting data encoded on a surface of data storage tape 20. In the case of magnetic tape, the data may be encoded in magnetic domains. If leader 23 detaches from opening 16 in housing 12, the tape drive may have difficulty grasping data storage tape 20, which may render data storage cartridge 10 unusable or require maintenance.

In addition to substantially reducing the occurrence of leader 23 detaching from opening 16, generating slack in region 22 may also substantially reduce breakage of data storage tape 20. In some cases, tension in region 22 caused by impact loads or other types of loads may break data storage tape 20 instead of detaching leader 23 from opening 16. This may be more probable when leader 23 comprises a leader pin or leader block as illustrated in FIG. 2. Future generation data storage tapes are becoming thinner and thinner in order to increase storage capacity of data storage cartridges by allowing more tape to reside in a given cartridge. The invention may be applied to such future generation data storage cartridges to substantially reduce the risk of breaking the thin data storage tape.

Figure 3:
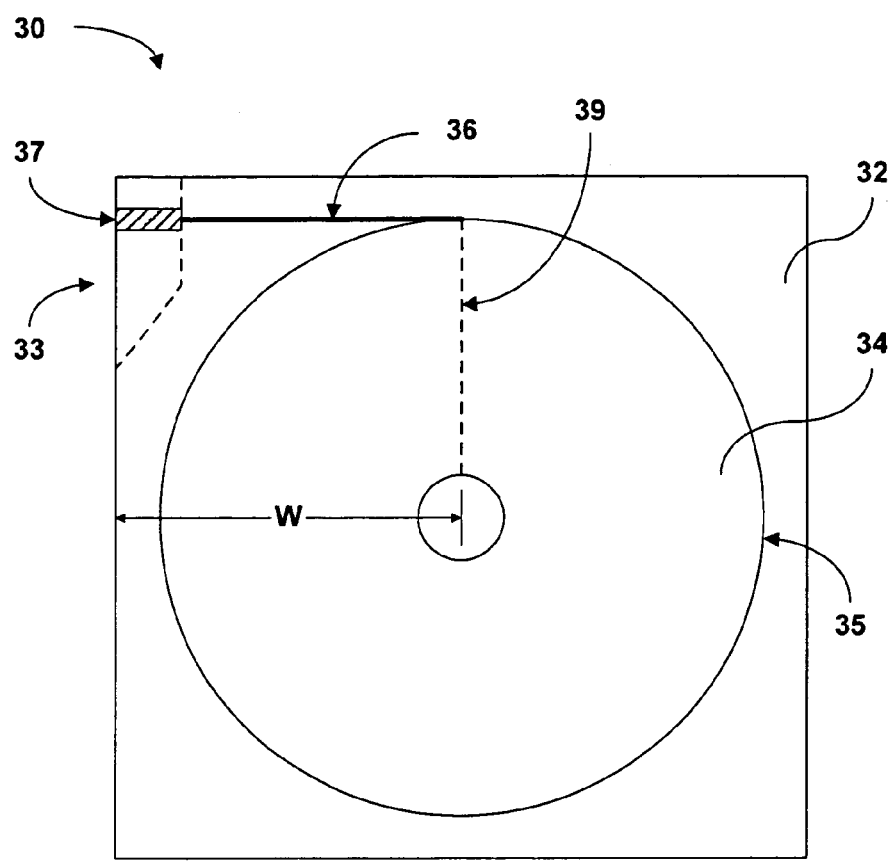
FIG. 3 is a schematic diagram illustrating a conventional data storage cartridge.

FIG. 3 is a schematic diagram illustrating a conventional data storage cartridge 30. Data storage cartridge 30 comprises a housing 32 that includes an opening 33. Housing 32 encloses a spool 34 with data storage tape 35 spooled on spool 34. A region 36 of data storage tape 35 extends from spool 34 to opening 33 in housing 32. An end of data storage tape 35 includes a leader 37 which is held at opening 33. In some embodiments, housing 32 may comprise notches adjacent opening 33 that hold leader 37. In the illustrated embodiment, leader 37 comprises a leader pin or a leader block that extends over the very end of data storage tape 35. In other embodiments, leader 37 may comprise a substantially stiff leader tape that extends from spool 34 to opening 33 in housing 32. In some cases, a stiff leader tape may be up to approximately 18 inches (45.7 cm) in length.

Spool 34 comprises a locking position 39. Locking position 39 is a rotational position of spool 34 at which region 36 between spool 34 and opening 33 is taut. In other words, locking position 39 is the position of spool 34 when data storage tape 35 is completely spooled onto spool 34 with leader 37 held at opening 33. Data storage cartridge 30 may include a plurality of gear teeth that mechanically lock spool 35 at locking position 39.

As shown in FIG. 3, data storage cartridge 30 comprises a distance W between a tangent point of spool 34 and a face of housing 32. When spool 34 is in locking position 39, region 36 of data storage tape 35 comprises a length approximately equal to W. Therefore, region 36 comprises at least some tension, which can substantially increase when spool 34 moves relative to opening 33 in housing 32, e.g., in response to a load introduced by dropping the cartridge. The tension may cause leader 37 to detach from opening 33, in which case a tape drive can no longer use data cartridge 30 without maintenance.

If data storage cartridge 30 experiences impact loads due to being dropped, for example, spool 34 and region 36 and leader 37 of data storage tape 35 may move with respect to opening 33. Although spool 34 may be locked to housing 32, even a slight movement of spool 34 pushes and pulls region 36 and leader 37 within the notches that hold leader 37 at opening 33. The impact loads produce relative displacement of the parts that compose data storage cartridge 30. The displacement generates significant loads on region 36 of data storage tape 35, which is already under tension with spool 34 at locking position 39. The loads, along with the effect of inertia, can cause detachment of leader 37 from opening 33.

Figure 4:
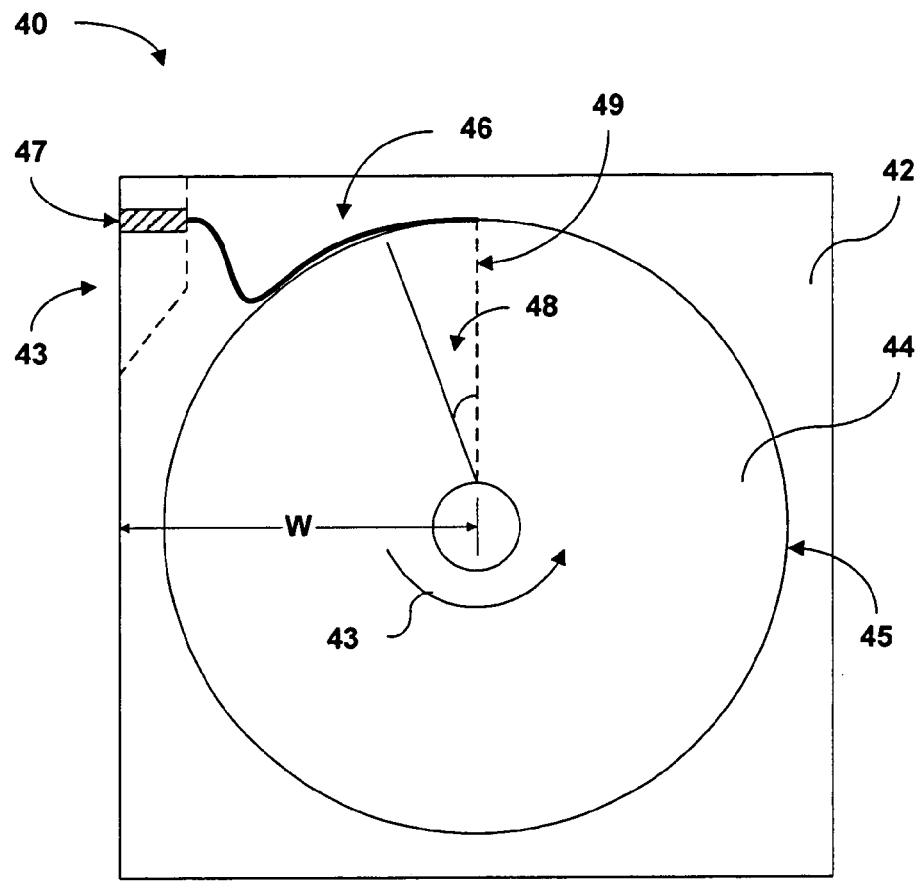
FIG. 4 is a schematic diagram illustrating a data storage cartridge in accordance with an embodiment of the invention.

FIG. 4 is a schematic diagram illustrating a data storage cartridge 40 in accordance with an embodiment of the invention. Data storage cartridge 40 may be substantially similar to data storage cartridge 10 illustrated in FIGS. 1 and 2. Data storage cartridge 40 comprises a housing 42 that includes an opening 43. Housing 42 encloses a spool 44 with data storage tape 45 spooled on spool 44. A region 46 of data storage tape 45 extends from spool 44 to opening 43 in housing 42. An end of data storage tape 45 includes a leader 47 which is held at opening 43. In some embodiments, housing 42 may comprise notches adjacent opening 43 that hold leader 47.

In the illustrated embodiment, leader 47 comprises a leader pin or a leader block that extends over the very end of data storage tape 45. In other embodiments, leader 47 may comprise a substantially stiff leader tape that extends from spool 44 to opening 43 in housing 42. In some cases, a stiff leader tape may be up to approximately 18 inches (45.7 cm) in length.

Spool 44 comprises a locking position 49. Locking position 49 is a rotational position of spool 44 at which region 46 between spool 44 and opening 43 is taut. In other words, locking position 49 is the position of spool 44 when data storage tape 45 is completely spooled onto spool 44 with leader 47 held at opening 43. Data storage cartridge 40 comprises a distance W between a tangent point of spool 44 and a face of housing 42. When spool 44 is in locking position 49, region 46 of data storage tape 45 comprises a length approximately equal to W, similar to the conventional illustration of FIG. 3.

As shown in FIG. 4, however, spool 44 is rotated in a direction 43 from locking position 49 to generate slack in region 46 of data storage tape 45. In this way, region 46 of data storage tape 45 comprises a length greater than W. Region 46 then comprises substantially no tension when spool 44 moves relative to opening 43 in housing 42. Spool 44 may be rotated by a predetermined amount based on a diameter of spool 44 and a length of slack desired in region 46 of data storage tape 45. The length of slack desired may depend on a distance spool 44 is capable of moving in any direction within housing 42. Spool 44 is rotated by an angle 48 of Θ degrees from locking position 49. Angle 48 may be less than 10 degrees. In some cases, angle 48 may be approximately equal to 7 degrees.

For example, spool 44 may comprise a diameter of approximately 100 mm and a circumference of approximately of 100π or 314.2 mm. If spool 44 is rotated by approximately 7 degrees from locking position 49, region 46 of data storage tape 45 comprises a length of slack approximately equal to approximately 6 mm. In other words, the length of slack generated in region 46 of data storage tape 45 may be calculated as an arc length $$s = \frac{n}{360}C,$$

where n comprises degrees of angle 48 and C comprises a circumference of spool 44. In the case where spool 44 is capable of moving approximately 1 mm in any direction within housing 42, the distance W is approximately equal to 51 mm. Region 46 of data storage tape 45 then comprises a length of W+s approximately equal to 57 mm.

If data storage cartridge 40 experiences impact loads due to being dropped, for example, spool 44 and region 46 and leader 47 of data storage tape 45 move with respect to opening 43. Although spool 44 may lock to housing 42, the movement of spool 44 pushes and pulls region 46 and leader 47 within the notches that hold leader 47 at opening 43. The impact loads produce relative displacement of the parts that compose data storage cartridge 40, more particularly, each portion of housing 42 and spool 44. Due to the length of slack generated by rotating spool 44 by angle 48 from locking position 49, however, region 46 of data storage tape 45 remains substantially unaffected by the displacement.

Figure 5A:
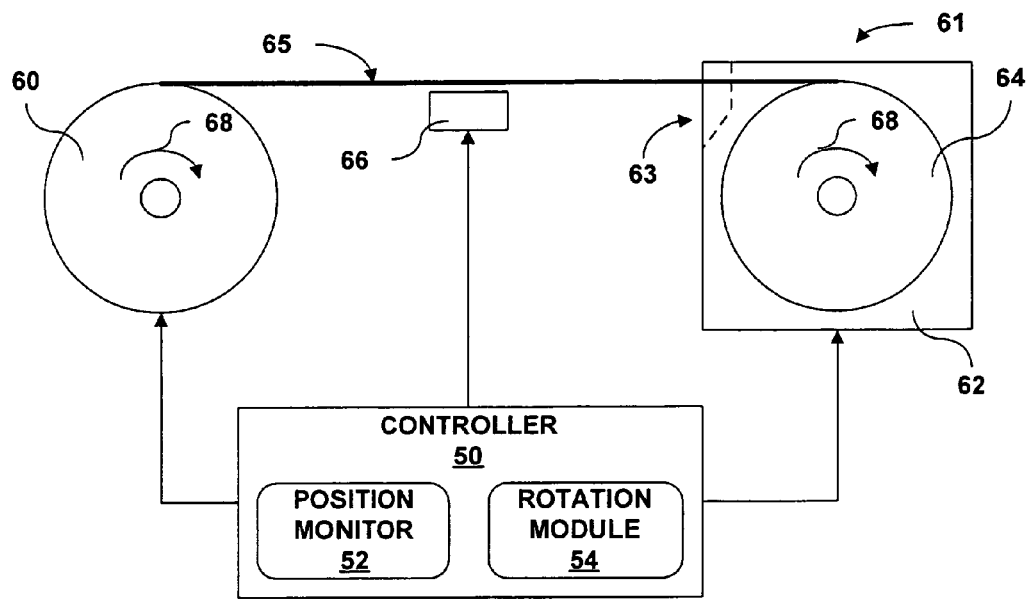
FIGS. 5A–5C are block diagrams illustrating an example data storage tape recording system.
Figure 5B:
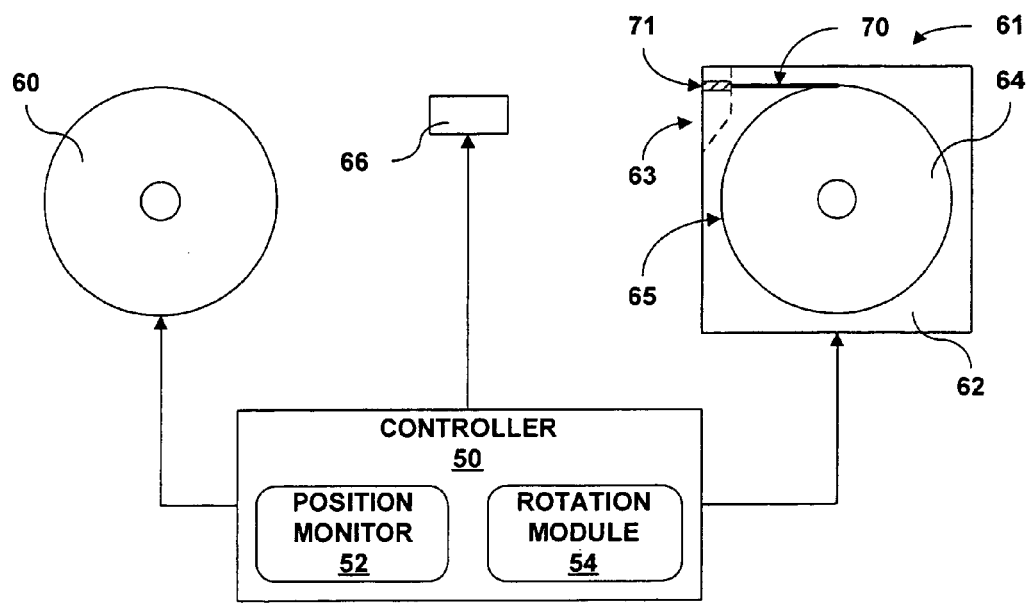
Figure 5C:
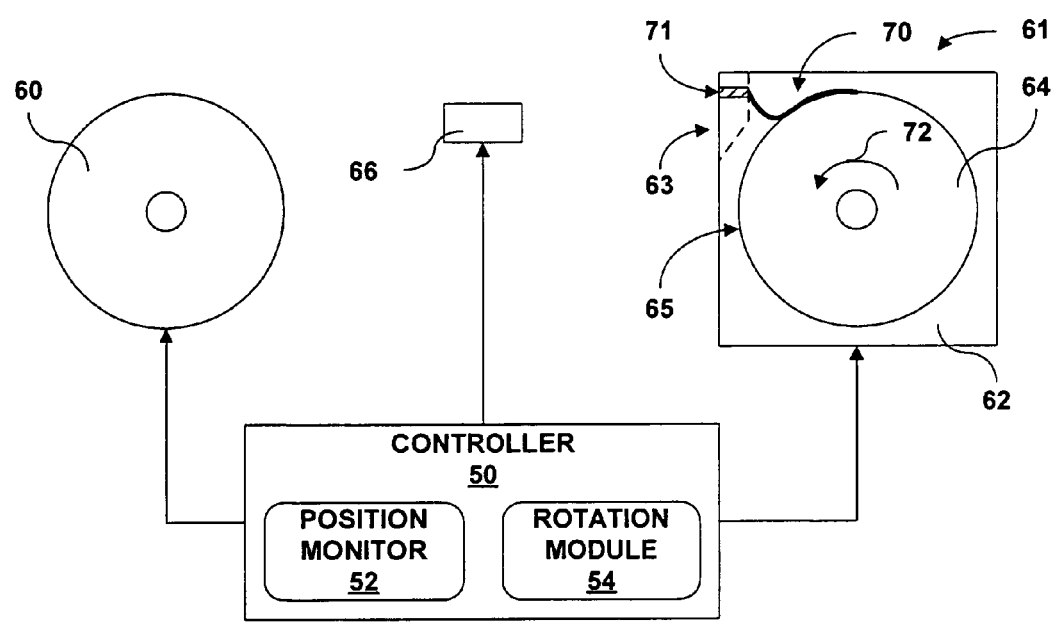

FIGS. 5A–5C are block diagrams illustrating an example data storage tape recording system. The recording system includes a first spool 60, a data storage cartridge 61, a controller 50, and a recording head 66 coupled to controller 50. Data storage cartridge 61 may be substantially similar to data storage cartridge 10 (FIGS. 1 and 2) and data storage cartridge 40 (FIG. 4). Data storage cartridge 61 comprises a housing 62 that includes an opening 63 and encloses a second spool 64.

Controller 50 controls first spool 60 and second spool 64 enclosed within data storage cartridge 61. Controller 50 may drive first spool 60 to rotate first spool 60 and second spool 64 in a first direction 68 to spool data storage tape 65 onto second spool 64 from first spool 60. Data storage tape 65 passes adjacent recording head 66 between first spool 60 and second spool 64. Recording head 66 records data onto data storage tape 65 according to directions received from controller 50. Controller 50 may then drive second spool 64 to re-spool data storage tape 65 onto second spool 64 through opening 63 in housing 62. In some embodiments, data storage tape 65 comprises magnetic tape and recording head 66 comprises a magnetic recording head capable of encoding data in magnetic domains on magnetic tape.

Controller 50 comprises a position monitor 52 that monitors current resistance of second spool 64 while data storage tape 65 spools onto second spool 64. When a peak current resistance is detected, position monitor 52 determines a rotational position of spool 64. In this way, position monitor 52 detects a locking position of second spool 64. As described above, the locking position comprises the rotational position of second spool 64 when data storage tape 65 is completely spooled onto second spool 64.

Data storage tape 65 includes a region 70 that extends from second spool 64 to opening 63 in housing 62 with an end of data storage tape 65 held at opening 63. The end of data storage tape 65 comprises a leader 71. In some cases, leader 71 may comprise a leader tape, a leader pin, a leader block, or another type of element capable of interfacing with a tape drive. Housing 62 may comprise notches adjacent opening 63 to hold leader 71 at opening 63 in housing 62. As shown in FIG. 5B, region 70 of data storage tape 65 is held taut between second spool 64 and opening 63 when second spool 64 is in the locking position.

Controller 50 also includes a rotation module 54. Once position monitor 52 detects the locking position of second spool 64, rotation module 54 rotates second spool 64 to generate slack in region 70 of data storage tape 65. As can be seen in FIG. 5C, rotation module 54 generates slack in region 70 by rotating second spool 64 in a second direction 72 substantially opposite first direction 68. In some cases, rotation module 54 rotates second spool 64 by a predetermined amount based on a diameter of second spool 64 and a length of slack desired for region 70 of data storage tape 65. In other cases, rotation module 54 may calculate the amount of rotation from input that includes the diameter of second spool 64 and the desired length of slack in region 70.

Generating slack in region 70 of data storage tape 65 enables data storage cartridge 61 to withstand impact loads, e.g., from being dropped, without leader 71 detaching from opening 63. Again, when data storage cartridge 61 experiences impact loads, housing 62 may deform and spool 64 may move in any direction within housing 62. This displacement pushes and pulls on region 70 and leader 71. However, slack in region 70 of data storage tape 64 provides a displacement buffer. Region 70 comprises substantially no tension when second spool 64 moves relative to opening 63 in housing 62. In this way, rotating second spool 64 substantially reduces or eliminates the occurrence of leader 71 detaching from opening 63.

Figure 6:
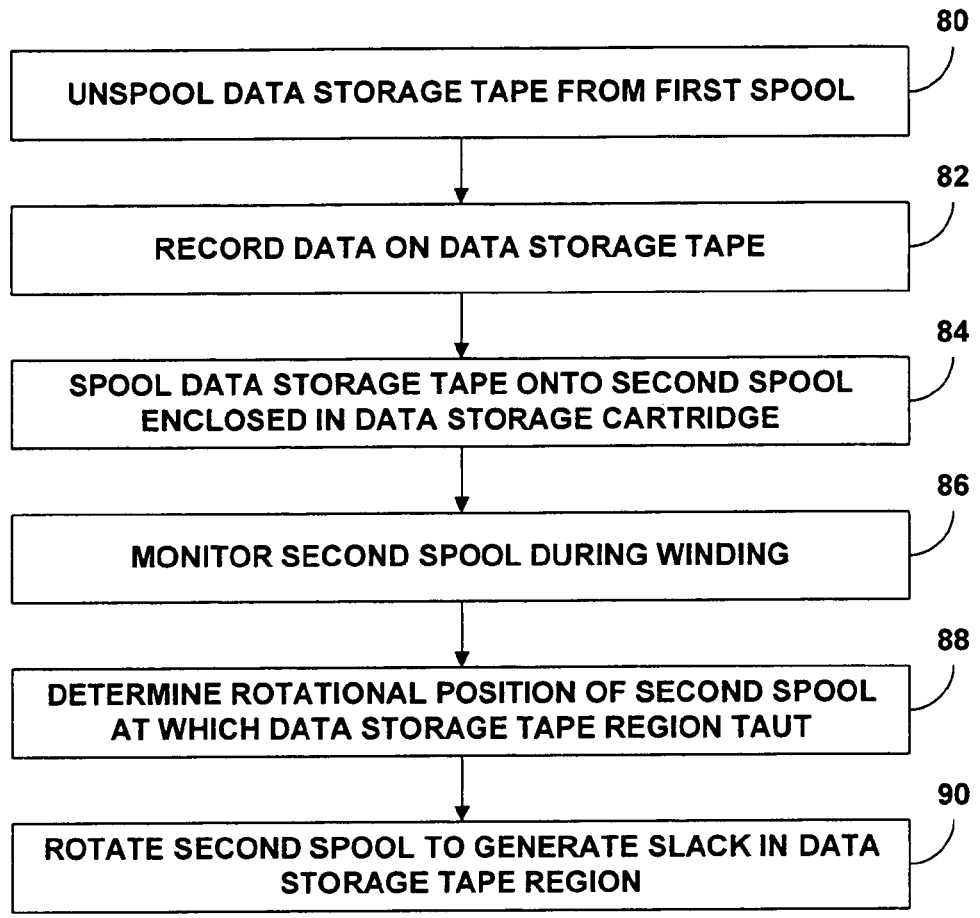
FIG. 6 is a flow chart illustrating an exemplary process for spooling data storage tape into a data storage cartridge.

FIG. 6 is a flow chart illustrating an exemplary process for spooling data storage tape into a data storage cartridge. The process will be described herein in relation to FIGS. 5A–5C. Controller 50 unspools data storage tape 65 from first spool 60 (80). Data storage tape 65 passes adjacent recording head 66 (or a read head) between first spool 60 and second spool 64 enclosed in housing 62 of data storage cartridge 61. Controller 50 directs recording head 66 to record data (or read data) on data storage tape 65 (82). Controller 50 then rotates second spool 64 in first direction 68 to spool data storage tape 65 onto second spool 64 (84).

While data storage tape 65 spools onto second spool 64, position monitor 52 included in controller 50 monitors current resistance of second spool 64 (86). Position monitor 52 determines a rotational position of second spool 64 when a peak current resistance is detected (88). In this way, position monitor 52 detects a locking position of second spool 64 at which region 70 of data storage tape 65 is taut between second spool 64 and opening 63 in housing 62.

Rotation module 54 rotates second spool 64 in second direction 72 substantially opposite first direction 68 to generate slack in region 70 of data storage tape 65 (90). In particular, rotation module 54 rotates second spool 64 by a predetermined amount such that region 70 comprises substantially no tension when second spool 64 moves relative to opening 63 in housing 62. Rotating second spool 64 by less than 10 degrees substantially reduces or eliminates the occurrence of leader 71 detaching from opening 63 in housing 62. Data storage cartridge 61 still experiences impact loads when dropped, but the length of slack added to region 70 ensures the impact loads will not affect leader 71 held at opening 63 of housing 62.

Controller 50 may perform the functions described above by executing program instructions stored in a computer-readable medium. The computer-readable medium may include any magnetic, electronic, or optical media, such as random access memory (RAM), read-only memory (ROM), electronically-erasable programmable ROM (EEPROM), flash memory, or the like, or a combination thereof. In general, controller 50 may be implemented as software, hardware, firmware, one or more processors or digital signal processors (DSPs), one or more application specific integrated circuits (ASICs) or field programmable gate arrays (FPGAs), or any combination of hardware, software, firmware, or processors.

Figure 7:
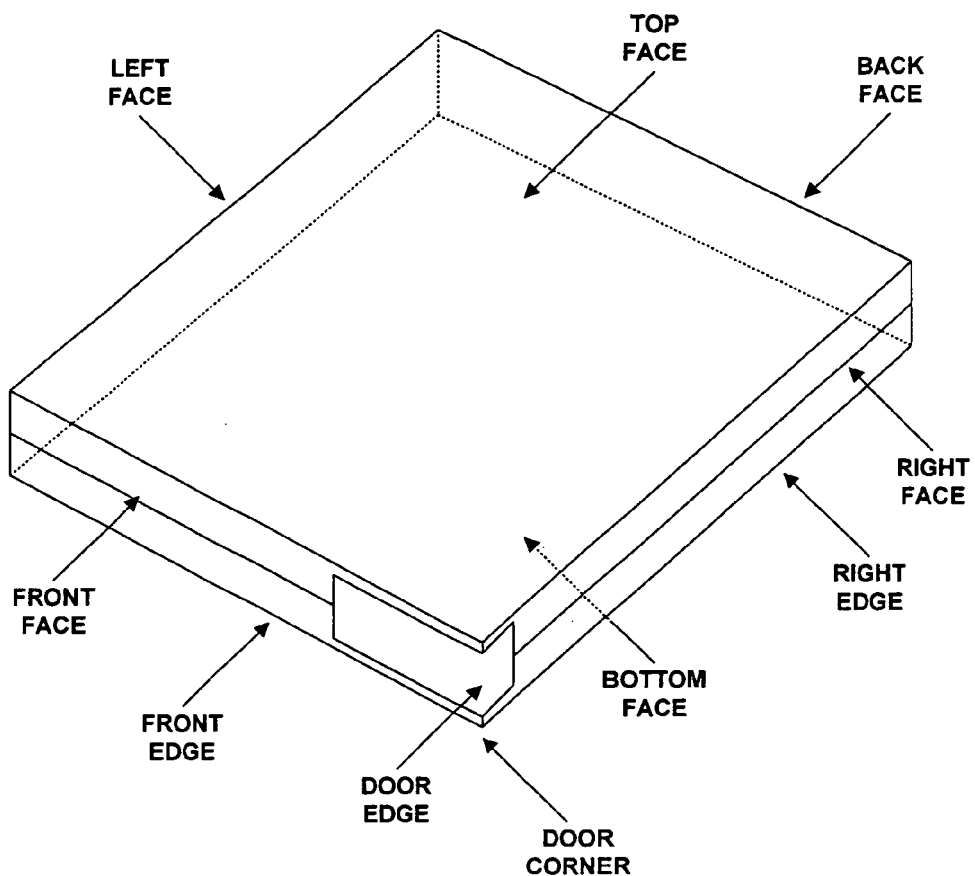
FIG. 7 is a schematic diagram illustrating drop positions of a data storage cartridge.

FIG. 7 is a schematic diagram illustrating drop positions of a data storage cartridge. FIG. 7 is labeled to define impact the points of drop testing. Tables 1–3 below list the position of a leader and any structural damage sustained after dropping the data storage cartridge at each of the drop positions.

Table 1 comprises a comparison between a first type of data storage cartridge without slack and with slack. The data shown in Table 1 is based on a 0.8 meter (30 inch) drop test. The leader of the data storage tape without slack detached from the data storage cartridge when dropped at the front edge, the right edge, the door edge, and the door corner. The leader of the data storage tape with slack did not detach from the data storage cartridge at any of the drop positions.

TABLE 1

| Drop Position | Cartridge 1 without slack | | Cartridge 1 with slack | |
|---|---|---|---|---|
| | Damage | Leader Position | Damage | Leader Position |
| Bottom Face | none | leader in | none | leader in |
| Top Face | none | leader in | none | leader in |
| Back Face | none | leader in | none | leader in |
| Right Face | none | leader in | none | leader in |
| Front Face | none | leader in | none | leader in |
| Left Face | none | leader in | none | leader in |
| Front Edge | none | leader out | none | leader in |
| Right Edge | none | leader out | none | leader in |
| Door Edge | none | leader out | none | leader in |
| Door Corner | cracked under weld | leader out | none | leader in |

Table 2 comprises a comparison between a second type of data storage cartridge without slack and with slack. The data shown in Table 2 is based on a 0.8 meter (30 inch) drop test. The leader of the data storage tape without slack detached from the data storage cartridge when dropped at the right face, the front edge, and the right edge. The leader of the data storage tape with slack detached from the data storage cartridge only when dropped at the door edge.

TABLE 2

| Drop Position | Cartridge 2 without tape slack | | Cartridge 2 with tape slack | |
|---|---|---|---|---|
| | Damage | Leader Position | Damage | Leader Position |
| Bottom Face | none | leader in | none | leader in |
| Top Face | none | leader in | none | leader in |
| Back Face | none | leader in | none | leader in |
| Right Face | none | leader out | none | leader in |
| Front Face | none | leader in | none | leader in |
| Left Face | none | leader in | none | leader in |
| Front Edge | none | leader out | none | leader in |
| Right Edge | none | leader out | none | leader in |
| Door Edge | cracked below weld | leader in | none | leader out |
| Door Corner | none | leader in | none | leader in |

Table 3 comprises a comparison between the first type of data storage cartridge with slack and the second type of data storage cartridge with slack. The data shown in Table 3 is based on a 1 meter (39 inch) drop test. The leader detached from the first type of data storage cartridge when dropped at the front edge. The leader detached from the second type of data storage cartridge when dropped at the back face. The door closed under the leader of the second type of data storage cartridge after being dropped at the right edge.

TABLE 3

| Drop Position | Cartridge 1 | | Cartridge 2 | |
|---|---|---|---|---|
| | Damage | Leader Position | Damage | Leader Position |
| Bottom Face | none | leader in | none | leader in |
| Top Face | none | leader in | none | leader in |
| Back Face | none | leader in | broken weld | leader out |
| Right Face | none | leader in | none | leader in |
| Front Face | none | leader in | none | leader in |
| Left Face | none | leader in | none | leader in |
| Front Edge | none | leader out | none | leader in |
| Right Edge | none | leader in | broken screw bosses | door closes under leader |
| Door Edge | none | leader in | none | leader in |
| Door Corner | none | leader in | none | leader in |

In general, the data of Tables 1–3 tends to show that the introduction of slack into the region of tape extending the spool to the opening in the housing reduces the occurrence of pop-out.

Various embodiments of the invention have been described. For example, a data storage cartridge has been described that includes data storage tape spooled on a spool with a region of the data storage tape extended from the spool to an opening in the data storage cartridge housing that comprises substantially no tension. Furthermore, a process has been described that includes rotating the spool to generate slack in the region of the data storage tape such that the region comprises substantially no tension. The invention substantially reduces or eliminates detachment of the data storage tape from the data storage cartridge, and in some cases can reduce the occurrence of breakage of the data storage tape, due to impact loads and other forces experienced by the data storage cartridge. These and other embodiments are within the scope of the following claims.

The invention claimed is:

1. A data storage cartridge comprising:
a housing including an opening;
a spool enclosed in the housing; and
data storage tape spooled on the spool, a region of the data storage tape extended from the spool to the opening in the housing with an end of the data storage tape held at the opening, wherein the spool is rotated such that the region of the data storage tape extending from the spool to the opening comprises substantially no tension.

2. The data storage cartridge of claim 1, wherein the region of the data storage tape extending from the spool to the opening comprises substantially no tension when the spool moves with respect to the opening in the housing.

3. The data storage cartridge of claim 1, wherein the opening is located on a face of the housing, and wherein the region of the data storage tape extending from the spool to the opening comprises a length greater than a distance between a tangent point of the spool and the face of the housing.

4. The data storage cartridge of claim 1, wherein the spool is rotated by a predetermined amount based on a diameter of the spool and a length of slack desired in the region of the data storage tape extending from the spool to the opening.

5. The data storage cartridge of claim 4, wherein the length of slack desired depends on a distance the spool is capable of moving in any direction within the housing.

6. The data storage cartridge of claim 1, wherein the spool is rotated less than 10 degrees.

7. The data storage cartridge of claim 1, wherein the spool is rotated approximately 7 degrees.

8. The data storage cartridge of claim 1, wherein the end of the data storage tape comprises one of a leader tape, a leader pin, or a leader block.

9. The data storage cartridge of claim 1, further comprising a door that covers the opening in the housing.

10. The data storage cartridge of claim 1 wherein the housing comprises notches adjacent the opening to hold the end of the data storage tape at the opening.

11. The data storage cartridge of claim 1, wherein the data storage tape comprises magnetic tape.

12. A method comprising:
spooling data storage tape onto a spool enclosed in a housing of a data storage cartridge through an opening in the housing;
detecting a locking position of the spool at which a region of the data storage tape extending from the spool to the opening in the housing with an end of the data storage tape held at the opening is taut; and
rotating the spool from the locking position such that the region of the data storage tape extending from the spool to the opening comprises substantially no tension.

13. The method of claim 12, wherein spooling the data storage tape comprises spooling the data storage tape onto the spool in a first direction, and wherein rotating the spool comprises rotating the spool in a second direction, wherein the second direction is substantially opposite the first direction.

14. The method of claim 12, wherein the opening is located on a face of the housing, and wherein rotating the spool comprises rotating the spool such that the region of the data storage tape extending from the spool to the opening comprises a length greater than a distance between a tangent point of the spool and the face of the housing.

15. The method of claim 12, wherein rotating the spool comprises generating slack in the region of the data storage tape extending from the spool to the opening.

16. The method of claim 12, wherein detecting the locking position comprises:
monitoring current resistance of the spool while spooling the data storage tape onto the spool; and
determining a rotational position of the spool when a peak current resistance is detected.

17. A system comprising:
a data storage cartridge including a spool enclosed in a housing, the housing including an opening; and
a controller that spools data storage tape onto the spool through the opening in the housing, detects a locking position of the spool at which a region of the data storage tape extending from the spool to the opening in the housing with an end of the data storage tape held at the opening is taut, and rotates the spool from the locking position such that the region of the data storage tape extending from the spool to the opening comprises substantially no tension.

18. The system of claim 17, wherein the region of the data storage tape extending from the spool to the opening comprises substantially no tension when the spool moves with respect to the opening in the housing.

19. The system of claim 17, wherein the controller includes a rotation module that rotates the spool by a predetermined amount based on a diameter of the spool and a length of slack desired in the region of the data storage tape extending from the spool to the opening.

20. The system of claim 17, wherein the controller includes a position module that monitors current resistance of the spool while spooling the data storage tape onto the spool, and determines a rotational position of the spool when a peak current resistance is detected.

* * * * *